May 12, 1931.　　　F. D. HARDESTY　　　1,805,088

MOTOR VEHICLE LOCK

Filed June 25, 1923　　2 Sheets-Sheet 1

Witnesses
Geo. E. Pasco.
Wm. F. Pasco.

Inventor
Francis D. Hardesty

May 12, 1931.  F. D. HARDESTY  1,805,088
MOTOR VEHICLE LOCK
Filed June 25, 1923   2 Sheets-Sheet 2

Witnesses
Geo. C. Pasco.
Wm. P. Pasco.

Inventor
Francis D. Hardesty

Patented May 12, 1931

1,805,088

UNITED STATES PATENT OFFICE

FRANCIS D. HARDESTY, OF DAYTON, OHIO

MOTOR VEHICLE LOCK

Application filed June 25, 1923. Serial No. 647,438.

The present invention relates to theft prevention devices for automobiles and more specifically to devices for locking a control element of the vehicle, preferably the change speed gearing mechanism or transmission.

Among the objects of the invention is to obviate the necessity of voluntary acts on the part of the operator in order to lock the vehicle. Another object is to render locking of the vehicle automatic upon intentional stopping of the engine.

With these objects in view the invention consists in means tending automatically to lock a control element of the vehicle in combination with means for maintaining the locking means inoperative during operation of the vehicle and with means actuated by the operation of stopping the motor to release the locking means whereby the latter automatically locks the control element and consequently the vehicle against unauthorized use.

Further objects and advantages of the present invention will be apparent from the following description, reference being had to the accompanying drawings, wherein preferred forms of embodiments of the present invention are clearly shown.

Figure 1:
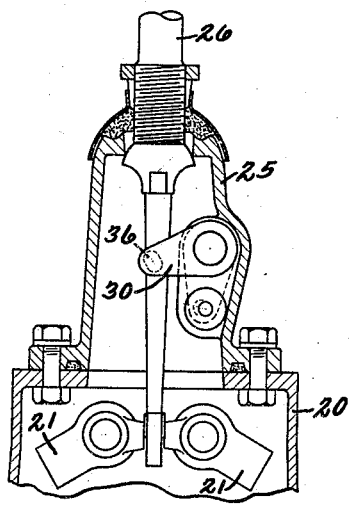
Fig. 1 shows a vertical section of the upper part of a transmission housing embodying one form of the device.

In the drawings, in Fig. 1, the transmission housing proper is shown at 20 and the shifting rods are indicated at 21. Bolted to the top of the transmission housing is a pedestal 25 carrying the shifting lever 26. This shifting lever 26, which may be mounted in pedestal 25 in any suitable fashion, extends down into the transmission proper and is adapted at its lower end to engage shifting bars 21 for the purpose of changing the meshing of the gears not shown.

Also mounted in pedestal 25 is a locking mechanism which consists of a fork member 30 provided with sockets 31 and 32 into which extend the portions of a lock barrel 33 and a short shaft 34, respectively. The lock barrel 33 and shaft 34 may be secured in the sockets in any suitable manner as by set screws 35.

Figure 2:
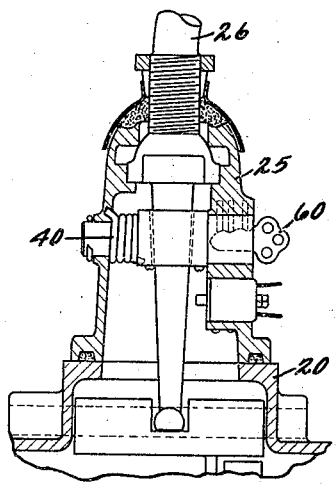
Fig. 2 is a view similar to Fig. 1 but at right angles thereto.
Figure 3:
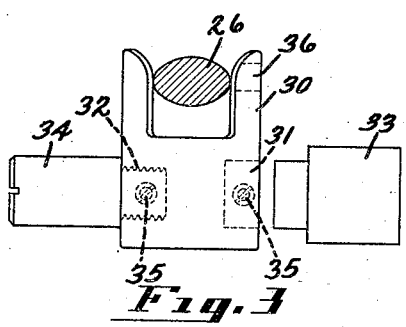
Fig. 3 is an enlarged detail of the locking fork and cylinder.
Figure 4:
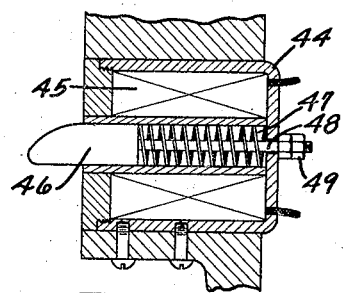
Fig. 4 is an enlarged sectional view of the coil and retaining pawl.

This locking mechanism is mounted in pedestal 25 in the manner indicated in Figs. 1 and 2, fork member 30 being entirely within the pedestal and adapted to swing from the position shown in full lines in Fig. 1 to the position shown in dotted lines in the same figure. The lock barrel serves as a shaft for mounting the fork member at one end thereof while the short shaft 34 serves as a mounting shaft at the other end of the fork member. Further, a spring 40 is mounted on the shaft 34 in such fashion as to cause fork member 30 normally to assume the position shown in full lines in Fig. 1, namely, the position in which the lower end of lever 26 is embraced by the fork member 30, that is, the locking position.

As indicated in Fig. 2, lock barrel 33 may be provided with any standard or suitable form of lock mechanism, the form shown being the well known barrel and tumbler or pin type.

Also mounted in the pedestal 25 is a small casing 44 containing an electric coil 45 which is adapted to surround a core piece 46 slidable therein and forced outwardly by means of a small spring 47. The core piece 46 is limited in its outward movement by means of a rod 48 secured thereto and threaded at its other end, passing through the coil housing and provided with suitable nuts 49.

Core member 46 is shaped to form a retaining pawl for fork piece 30 when the latter is in the position shown in dotted lines in Fig. 1, the pawl retaining the fork member in unlocked position by dropping into a suitable slot 36 in the fork.

Figure 5:
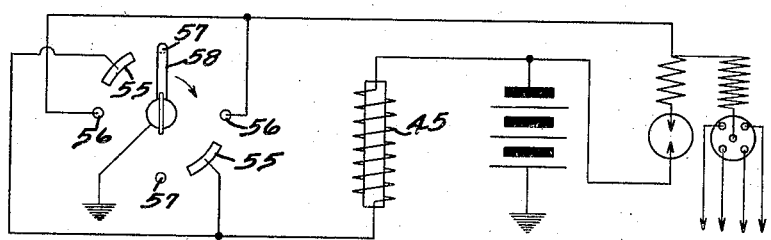
Fig. 5 is a wiring diagram showing the electric circuit involved.

Coil 45 is intended to be in an electric circuit which leads from the battery ordinarily carried by automobiles to an additional contact 55 provided in the ignition switch. This circuit together with the ignition circuit is illustrated in Fig. 5. In this figure, 55 represents a contact which will be placed between the live contact 56 and the dead contact 57. The switch indicated is a one-way switch and is, in the figure, in the "off" position. When the switch arm 58 is turned to contact with the contact point 56 no current will be sent to coil 45 but the circuit through the ignition wiring will be made. When however it is turned from contact point 56 to point 57, in order to break the ignition circuit, it must pass over contact member 55 and in so doing energizes coil 45 which will thereupon draw in core piece 47 and release the fork member 30 from unlocked position. Spring 40 will thereupon cause the fork member to raise and automatically lock the lever arm 26 when the latter is in neutral position. The fork member is preferably so designed that it will not lock lever 26 when in any other position than "neutral".

In order to unlock the lever it will be necessary to insert the key 60 into the lock barrel 33 and turn the fork to its unlocked position, whereupon core member 46 will drop into slot 36 and the lever will remain unlocked until the ignition has been turned on and again off.

Figure 6:
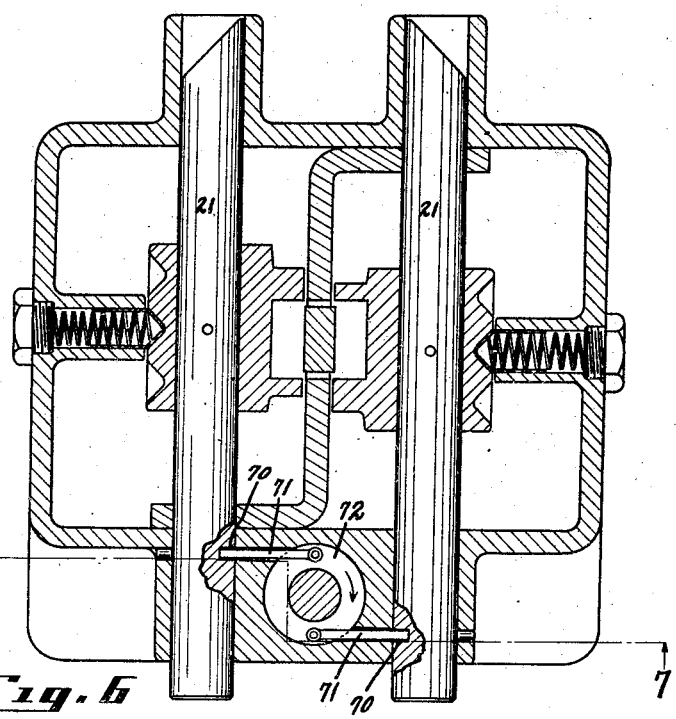
Fig. 6 shows a horizontal section through the upper portion of a transmission with a modified form of the device.
Figure 7:
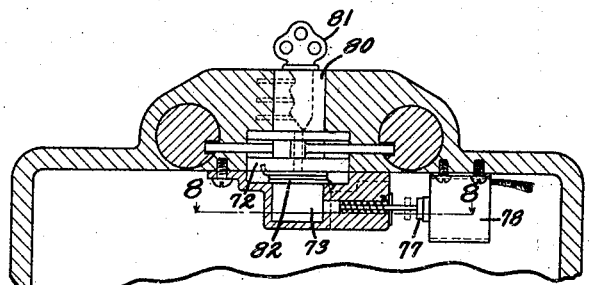
Fig. 7 shows a vertical section on line 7—7 of Fig. 6.
Figure 8:
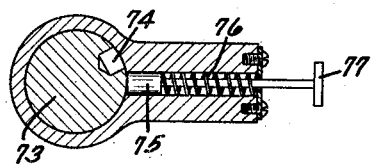
Fig. 8 is a section on line 8—8 of Fig. 7.

In Figs. 6, 7 and 8 a modified form of lock with a similar operation is shown. In these figures the shifting bars 21 are provided with sockets 70 into which are adapted to extend rods 71 which will then lock the shifting bars against movement. These rods 71 are pivotally mounted on a double disk 72 which is provided at its lower end with a shaft portion 73 having a socket 74 adapted to coact with pawl 75 to be retained in unlocked position. Also upon double disk 72 is mounted a lock barrel 80 adapted to be turned by suitable key 81 to unlocked position.

Pawl 75 is spring pressed toward shaft 73 by means of the small spring 76 and is formed on a member 77 which is the armature for a small electromagnet 78 corresponding to coil 45 shown in the form of lock just described.

The form of lock just described also includes a spring 82 which is adapted to turn double disk 72 into locking position whenever shaft 73 is released from pawl 75.

This form of lock is built into the transmission cover or housing instead of being mounted in the pedestal as is the case with the lock first described.

It will be seen from the foregoing description that it is impossible for the operator of an automobile provided with this type of lock to avoid locking the vehicle upon stopping the engine, as the locking device is entirely automatic in its operation. Whenever the usual process of cutting off the ignition and moving the gear shift lever into neutral position is accomplished, the transmission will be automatically locked without any further voluntary acts on the part of the operator.

It will be further seen that a lock made according to the present invention cannot be unlocked without the use of a key, as any tampering with the electrical circuits or with the coil 45 will have no effect on the locking mechanism. The only method of putting the lock out of commission is to destroy some of the necessary operating parts of the transmission or other control element to which the invention may be applied.

While the forms of embodiment of the present invention as herein disclosed, constitute preferred forms, it is to be understood that other forms might be adopted, all coming within the scope of the claims which follow.

What I claim is as follows:

1. In an automotive vehicle provided with a change speed transmission and a motor involving electric ignition, a device included in the transmission tending normally to lock said transmission; means for retaining said device in unlocked position; and means operated upon breaking the ignition circuit to release the retaining means.

2. In combination, a transmission lock comprising a locking member for a moving element of said transmission, said member adapted to be spring operated to locking position; a retaining pawl adapted to act upon said member to retain same when in unlocked position; and means for retracting the pawl to release the locking member.

3. In combination, a transmission having a control lever and a lock comprising a locking fork member for the control lever, said member adapted to be spring operated to locking position; a retaining pawl adapted to act upon said member to retain same when in unlocked position; and means for retracting the pawl to release the locking member.

4. In combination, a transmission lock comprising a locking member for a movable element of said transmission, said member adaped to be spring operated to locking position; a retaining pawl adapted to act upon said member to retain same when in unlocked position; and electromagnetic means for retracting the pawl to release the locking member.

5. In combination, a transmission lock comprising a locking fork member for the gear shifting lever, said member adapted to be spring operated to locking position; a retaining pawl adapted to act upon said member to retain same when in unlocked position; and electromagnetic means for retracting the pawl to release the locking member.

6. In combination, a transmission lock for a motor propelled vehicle comprising a locking member for a movable element of said transmission adapted to be spring operated to locking position; a retaining pawl adapted to retain said member in unlocked position; motor control means and means for retracting said pawl and releasing, said member adapted to be set in operation by the actuation of said motor control means to stop said motor.

7. In combination, a transmission lock comprising lock mechanism including a rotatable member carrying the locking elements; means for automatically rotating said member to locking position; mechanical means for retaining said member in unlocked position; and electrical means for temporarily rendering said retaining means inoperative whereby said transmission becomes automatically locked.

8. In combination, a transmission lock; an ignition switch; a member for retaining the lock inoperative when the ignition switch is in "on" position; a device for releasing said member and rendering said lock operative; said device being adapted to be operated by moving said switch from "on" to "off" position.

9. The combination in an automobile having a transmission of an ignition switch, spaced contacts on said switch adapted to be bridged for permitting electrical current to flow to the ignition points of the motor, said switch having a second pair of contacts in spaced relation to the first-mentioned pair of contacts, means adapted to engage a portion of the transmission for preventing manipulation of the same, a plunger for holding said means out of position to engage the said transmission, means normally tending to project said plunger into engagement with said means, a solenoid for retracting said plunger, and a connection between said solenoid and one of the second-mentioned contacts on said switch whereby when the switch is turned to bridge said second mentioned pair of contacts the solenoid will be energized to retract the locking plunger, substantially as set forth.

In testimony whereof I hereunto affix my signature.

FRANCIS D. HARDESTY.